US012602491B2

(12) United States Patent
Hale et al.

(10) Patent No.: US 12,602,491 B2
(45) Date of Patent: Apr. 14, 2026

(54) METHOD AND SYSTEM FOR USING SECURE REMOTE DIRECT MEMORY ACCESS (RDMA) SYSTEM

(71) Applicant: Lockheed Martin Corporation, Bethesda, MD (US)

(72) Inventors: Robert W. Hale, Montclair, VA (US); Kyle Alan Borowski, Louisville, CO (US); Mathew Lee VanDerPol, Louisville, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 125 days.

(21) Appl. No.: 18/522,677

(22) Filed: Nov. 29, 2023

(65) Prior Publication Data

US 2024/0176898 A1 May 30, 2024

Related U.S. Application Data

(60) Provisional application No. 63/429,068, filed on Nov. 30, 2022.

(51) Int. Cl.
*G06F 21/60* (2013.01)
*G06F 13/42* (2006.01)
(52) U.S. Cl.
CPC ........ *G06F 21/602* (2013.01); *G06F 13/4221* (2013.01); *G06F 2213/0026* (2013.01)
(58) Field of Classification Search
CPC ............... G06F 21/602; G06F 13/4221; G06F 2213/0026
See application file for complete search history.

(56) References Cited

U.S. PATENT DOCUMENTS 7,817,634 B2    10/2010   Coffman et al.
7,836,220 B2    11/2010   Desai et al.
(Continued)

FOREIGN PATENT DOCUMENTS

CN          113542234  A      10/2021

OTHER PUBLICATIONS

International Search Report and The Written Opinion corresponding to PCT International Application No. PCT/US2023/081596, dated Feb. 27, 2024, 16 pages.
(Continued)

*Primary Examiner* — Mohammed Waliullah
(74) *Attorney, Agent, or Firm* — Baker Botts L.L.P.

(57) ABSTRACT

Embodiments provide a method executed by a secure remote direct memory (RDMA) system. The method includes detecting, by the secure RDMA system, a connection request to create an encrypted connection between a first computing device and a second computing device. An encryption key is shared between the first computing device and the second computing device. In response to sharing the encryption key, accessing a plurality of images of a plurality of memories of the second computing device. The plurality of images of the plurality of memories includes memory addresses. The method includes receiving an access request specifying a range of memory addresses from the first computing device based on accessing the plurality of images of the plurality of memories. The method includes creating an encrypted tunnel between the first computing device and the second computing device to share memory information based on the range of memory addresses of the plurality of memories, in response to the access request.

18 Claims, 11 Drawing Sheets

(56) References Cited

U.S. PATENT DOCUMENTS

| | | | |
|---|---|---|---|
| 9,306,916 | B2 | 4/2016 | Snyder, II |
| 10,176,122 | B2 | 1/2019 | Kaplan et al. |
| 10,523,675 | B2 | 12/2019 | Bhabbur et al. |
| 10,567,372 | B2 | 2/2020 | Kassimis et al. |
| 11,082,411 | B2 | 8/2021 | Li et al. |
| 11,902,372 | B1 * | 2/2024 | Horowitz .............. H04L 67/146 |
| 2016/0267051 | A1 * | 9/2016 | Metzler ............. G06F 15/17331 |
| 2017/0155717 | A1 | 6/2017 | Tamir et al. |
| 2018/0095996 | A1 * | 4/2018 | Kondiles ................. G06F 16/25 |
| 2021/0365394 | A1 * | 11/2021 | Lu ....................... G06F 13/1668 |
| 2023/0027178 | A1 * | 1/2023 | Shah ................... G06F 13/4221 |
| 2024/0048373 | A1 * | 2/2024 | Recio ...................... H04L 9/088 |

OTHER PUBLICATIONS

Taranov Konstantin et al.: "sRDMA—Efficient NIC-based Authentication and Encryption for Remote Direct Memory Access", Oct. 25, 2020 (Oct. 25, 2020), pp. 691-704, XP055897296, retrieved from the Internet: URL:https://www.usenix.org/system/files/atc20-taranov_0.pdf.

* cited by examiner

200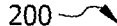

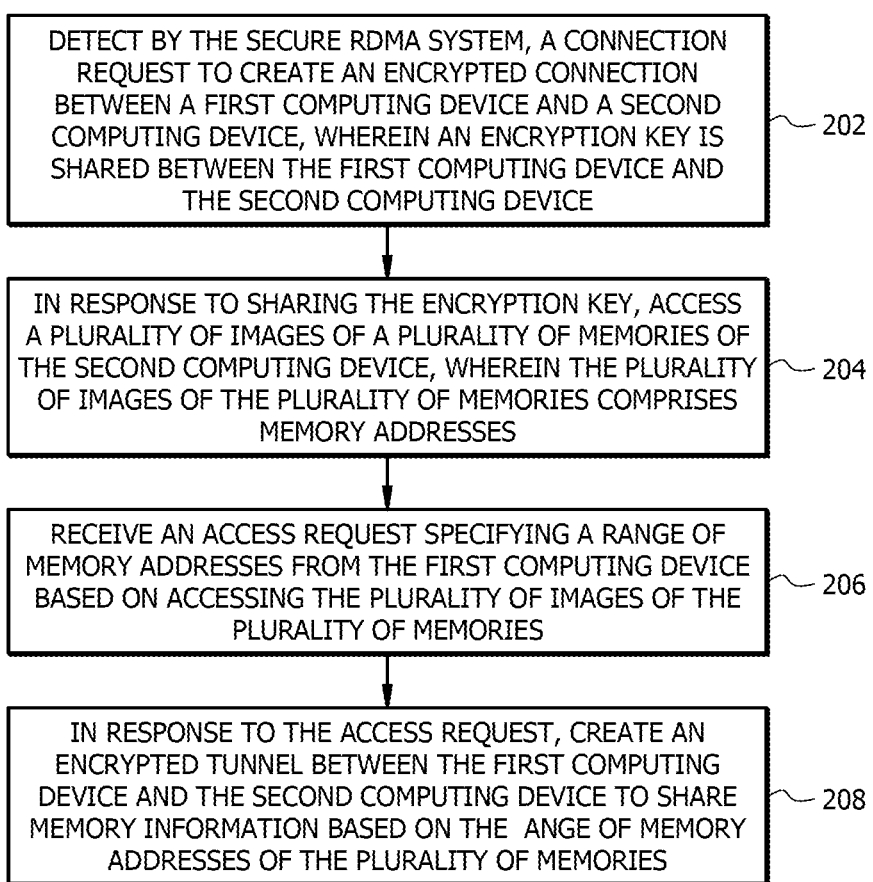

| DETECT BY THE SECURE RDMA SYSTEM, A CONNECTION REQUEST TO CREATE AN ENCRYPTED CONNECTION BETWEEN A FIRST COMPUTING DEVICE AND A SECOND COMPUTING DEVICE, WHEREIN AN ENCRYPTION KEY IS SHARED BETWEEN THE FIRST COMPUTING DEVICE AND THE SECOND COMPUTING DEVICE | 202 |

| IN RESPONSE TO SHARING THE ENCRYPTION KEY, ACCESS A PLURALITY OF IMAGES OF A PLURALITY OF MEMORIES OF THE SECOND COMPUTING DEVICE, WHEREIN THE PLURALITY OF IMAGES OF THE PLURALITY OF MEMORIES COMPRISES MEMORY ADDRESSES | 204 |

| RECEIVE AN ACCESS REQUEST SPECIFYING A RANGE OF MEMORY ADDRESSES FROM THE FIRST COMPUTING DEVICE BASED ON ACCESSING THE PLURALITY OF IMAGES OF THE PLURALITY OF MEMORIES | 206 |

| IN RESPONSE TO THE ACCESS REQUEST, CREATE AN ENCRYPTED TUNNEL BETWEEN THE FIRST COMPUTING DEVICE AND THE SECOND COMPUTING DEVICE TO SHARE MEMORY INFORMATION BASED ON THE ANGE OF MEMORY ADDRESSES OF THE PLURALITY OF MEMORIES | 208 |

Figure 3A:
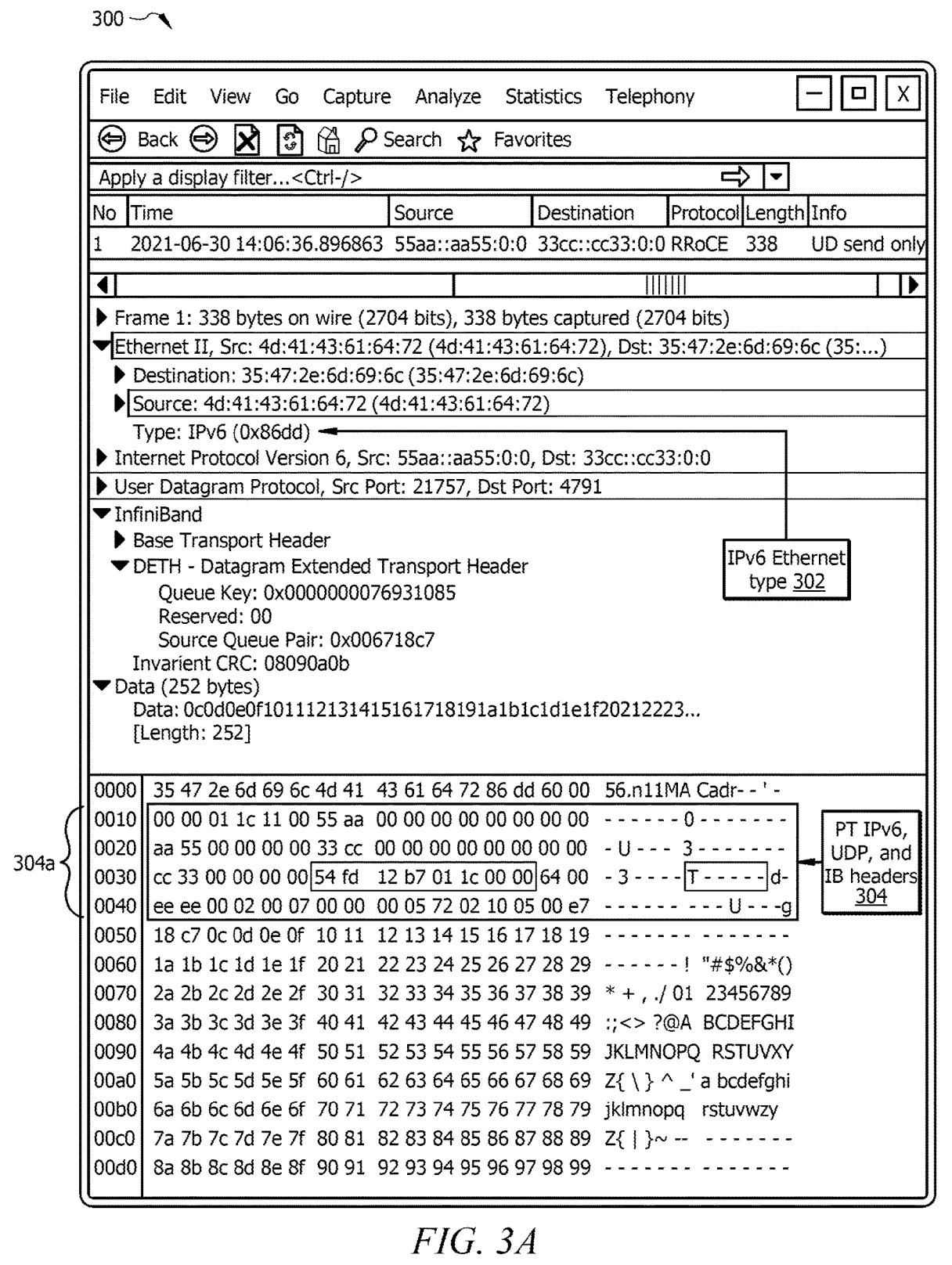

| File | Edit | View | Go | Capture | Analyze | Statistics | Telephony | — ▢ X |

◀⊜ Back ⊜▶  ✕  🗋  🏠  🔎 Search  ☆ Favorites

Apply a display filter...<Ctrl-/>                              ⇨ ▼

| No | Time | Source | Destination | Protocol | Length | Info |
|---|---|---|---|---|---|---|
| 1 | 2021-06-30 14:06:36.896863 | 55aa::aa55:0:0 | 33cc::cc33:0:0 | RRoCE | 338 | UD send only |

◀ ▭▭▭▭▭ ‖‖‖‖‖ ▭▭▭ ▶

▶ Frame 1: 338 bytes on wire (2704 bits), 338 bytes captured (2704 bits)
▼ Ethernet II, Src: 4d:41:43:61:64:72 (4d:41:43:61:64:72), Dst: 35:47:2e:6d:69:6c (35:...)
   ▶ Destination: 35:47:2e:6d:69:6c (35:47:2e:6d:69:6c)
   ▶ Source: 4d:41:43:61:64:72 (4d:41:43:61:64:72)
     Type: IPv6 (0x86dd) ◀─────────────────────────────┐
▶ Internet Protocol Version 6, Src: 55aa::aa55:0:0, Dst: 33cc::cc33:0:0 │
▶ User Datagram Protocol, Src Port: 21757, Dst Port: 4791 │
▼ InfiniBand │
   ▶ Base Transport Header │
   ▼ DETH - Datagram Extended Transport Header        ┌──────────┐
     Queue Key: 0x0000000076931085                 │IPv6 Ethernet│
     Reserved: 00                                  │ type 302 │
     Source Queue Pair: 0x006718c7                 └──────────┘
     Invarient CRC: 08090a0b
▼ Data (252 bytes)
     Data: 0c0d0e0f101112131415161718191a1b1c1d1e1f20212223...
     [Length: 252]

| 0000 | 35 47 2e 6d 69 6c 4d 41  43 61 64 72 86 dd 60 00 | 56.n11MA Cadr- - ' - |
| 0010 | 00 00 01 1c 11 00 55 aa  00 00 00 00 00 00 00 00 | - - - - - - 0 - - - - - - - - |
| 0020 | aa 55 00 00 00 00 33 cc  00 00 00 00 00 00 00 00 | - U - - - 3 - - - - - - - - |
| 0030 | cc 33 00 00 00 00 54 fd  12 b7 01 1c 00 00 64 00 | - 3 - - - - T - - - - - d- |
| 0040 | ee ee 00 02 00 07 00 00  00 05 72 02 10 05 00 e7 | - - - - - - - - - U - - -g |
| 0050 | 18 c7 0c 0d 0e 0f 10 11  12 13 14 15 16 17 18 19 | - - - - - - - - - - - - - - |
| 0060 | 1a 1b 1c 1d 1e 1f 20 21  22 23 24 25 26 27 28 29 | - - - - - - ! "#$%&*() |
| 0070 | 2a 2b 2c 2d 2e 2f 30 31  32 33 34 35 36 37 38 39 | * + , ./ 01 23456789 |
| 0080 | 3a 3b 3c 3d 3e 3f 40 41  42 43 44 45 46 47 48 49 | :;<> ?@A BCDEFGHI |
| 0090 | 4a 4b 4c 4d 4e 4f 50 51  52 53 54 55 56 57 58 59 | JKLMNOPQ RSTUVXY |
| 00a0 | 5a 5b 5c 5d 5e 5f 60 61  62 63 64 65 66 67 68 69 | Z{ \ } ^ _' a bcdefghi |
| 00b0 | 6a 6b 6c 6d 6e 6f 70 71  72 73 74 75 76 77 78 79 | jklmnopq rstuvwzy |
| 00c0 | 7a 7b 7c 7d 7e 7f 80 81  82 83 84 85 86 87 88 89 | Z{ | }~ -- - - - - - - - |
| 00d0 | 8a 8b 8c 8d 8e 8f 90 91  92 93 94 95 96 97 98 99 | - - - - - - - - - - - - |

304a {

┌──────────┐
│PT IPv6,  │
│UDP, and  │
│IB headers│
│  304     │
└──────────┘

```
# Beginning RDMA send test for rdma_send_tb.stimulus with Random Seed of 2284254708
# ** Info: [XPM_MEMORY 20-2] MEMORY_INIT_FILE (none), MEMORY_INIT_PARAM together specify no memo
nst.xpm_memory_base_inst.config_drc 48
#   Time:   1   ps   Scope:   rdma_send_tb.dut.rdma_send_ctl_inst.rdma_send_hdr_ram_inst.xpm_memory_ba
# ** Info:   [XPM_MEMORY 20-1] MEMORY_PRIMITIVE   (0)   instructs Vivado synthesis to choose the memor
primitive types.  Review XPM_MEMORY documentation and parameter values to understand any limitations
t.xpm_fifo_base_inst.gen_sdpram.xpm_memory_base_inst.config_drc
#   Time:   1   ps   Scope:   rdma_send_tb.dut.rdma_send_frag_inst.rdma_send_frag_hdr_fifo_inst.xpm_fi
xpm_memory.sv Line: 488
# reset... at time                    335000
# Beginning test at time                       2325000
# sending data...
# payload of            848 bytes
# number of rdma send packets         12
# payload of          15552 bytes
# RDMA Send message                    0 is fine
# RDMA Send message                    1 is fine
# RDMA Send message                    2 is fine
# RDMA Send message                    3 is fine
# RDMA Send message                    4 is fine
# RDMA Send message                    5 is fine
# RDMA Send message                    6 is fine
# payload of           6368 bytes
# RDMA Send message                    7 is fine
# RDMA Send message                    8 is fine
# payload of           3056 bytes
# payload of            176 bytes
# RDMA Send message                    9 is fine
# RDMA Send message                   10 is fine
# RDMA Send message                   11 is fine
# Load and check errors              0
# Payload errors                               0
# all done
# ** Note:  $finish      : ../../../../rdma_send.srcs/sim_1/rdma_send_tb.sv(76)
#   Time:  160885 ns  Iteration: 0 Instance: /rdma_send_tb
# End time: 10:48:14 on Jun 28, 2021, Elapsed time: 0:00:01
# Errors: 0, Warnings: 0
```

*FIG. 5A*

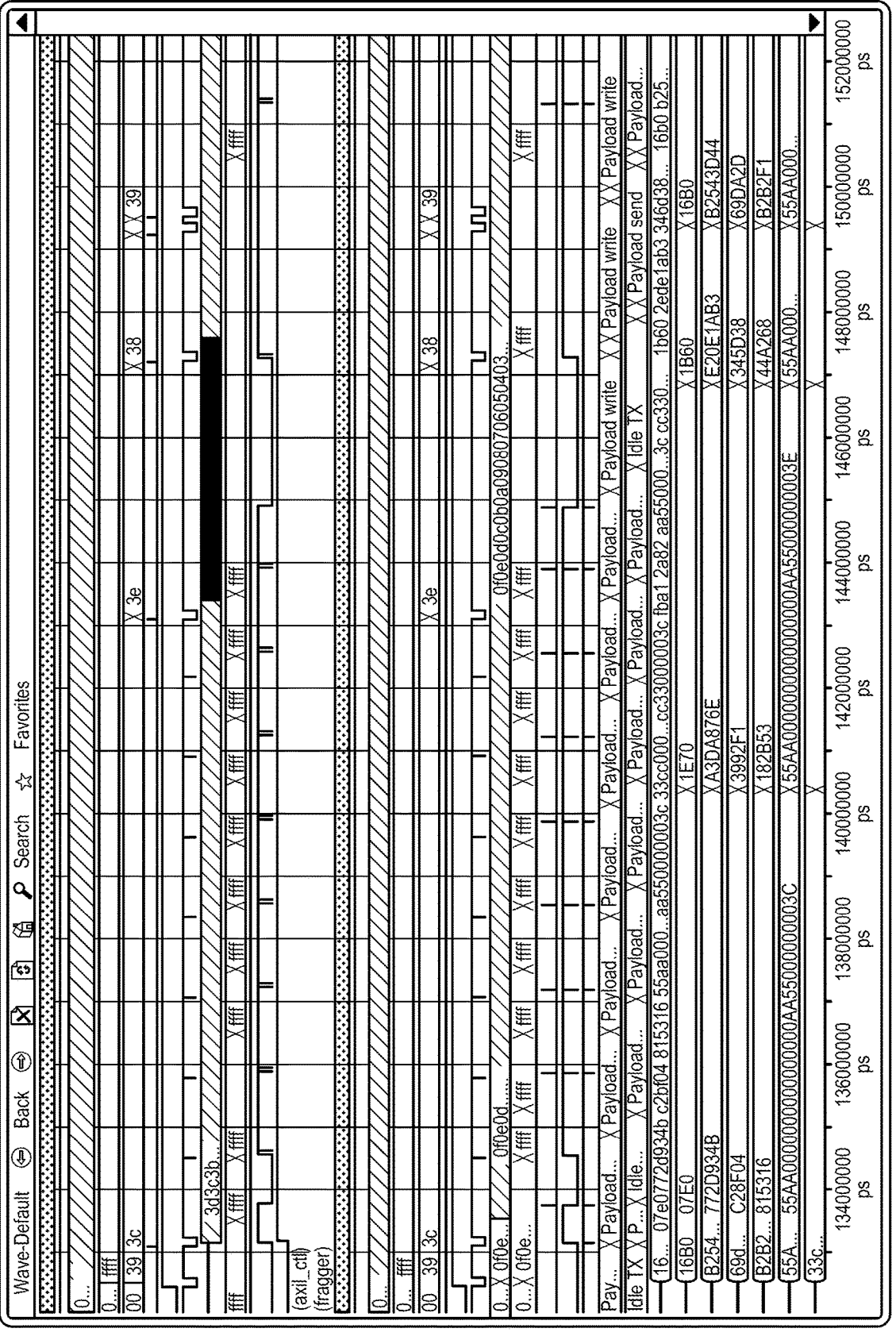
FIG. 5C (Continued From FIG. 5B)

```
[root@localhost /]# lsmod
module                  size   Used by
selftest                16384  0
serma                   28672  1 selftest
ib_uverbs               118784 1 serma
ib_core                 270336 3 selftest, serma, ib_uverbs
[root@localhost /]# echo "Jack and Kyle RDMA self test" > /dev/selftest
[1729419.820159] dma receiving to 0x00000000dfb78570 bytes 1024
[1729419.825808] dma receiving to phys 0x3d404000 bytes 1024
[1729419.831222] selftest module recv posted
[1729419.835223] dma sending from 0x0000000015a89e52 bytes 29
[root@localhost /]#
```

*FIG. 7*

METHOD AND SYSTEM FOR USING SECURE REMOTE DIRECT MEMORY ACCESS (RDMA) SYSTEM

BENEFIT CLAIM

This application claims the benefit under 35 U.S.C. § 119(e) of provisional patent application 63/429,068, filed Nov. 30, 2022, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

TECHNICAL FIELD

The present disclosure relates generally to secure remote direct memory access (RDMA) and more particularly, to methods, systems, and computer-readable media for providing memory monitoring remotely to protect from anomalous or malicious actions.

BACKGROUND

Existing remote direct memory access (RDMA) requires the installation of a hardware security controller on each board of servers and computers. Existing RDMA systems do not have abilities to monitor the memory space or storage space of remote computers unless the RDMA is installed in the remote computers. In such cases, capturing or detecting anomalies and malicious events impacting the remote computers involves tedious tasks. Also, detecting anomalies and malicious events takes place after malicious events occur.

BRIEF DESCRIPTION OF THE DRAWINGS

FIG. 2 depicts an example flowchart illustrating a process for secure memory access using a single hardware security controller (HSC), according to particular embodiments.

FIG. 3A, FIG. 3B illustrates an example of network packets analysis and results, according to particular embodiments.

FIG. 5A, FIG. 5B, and FIG. 5C illustrates an example of constrained random self-checking simulations, according to particular embodiments.

FIG. 7 illustrates an exemplary self-test kernel module, according to particular embodiments.

DETAILED DESCRIPTION

Overview

Figure 1A:
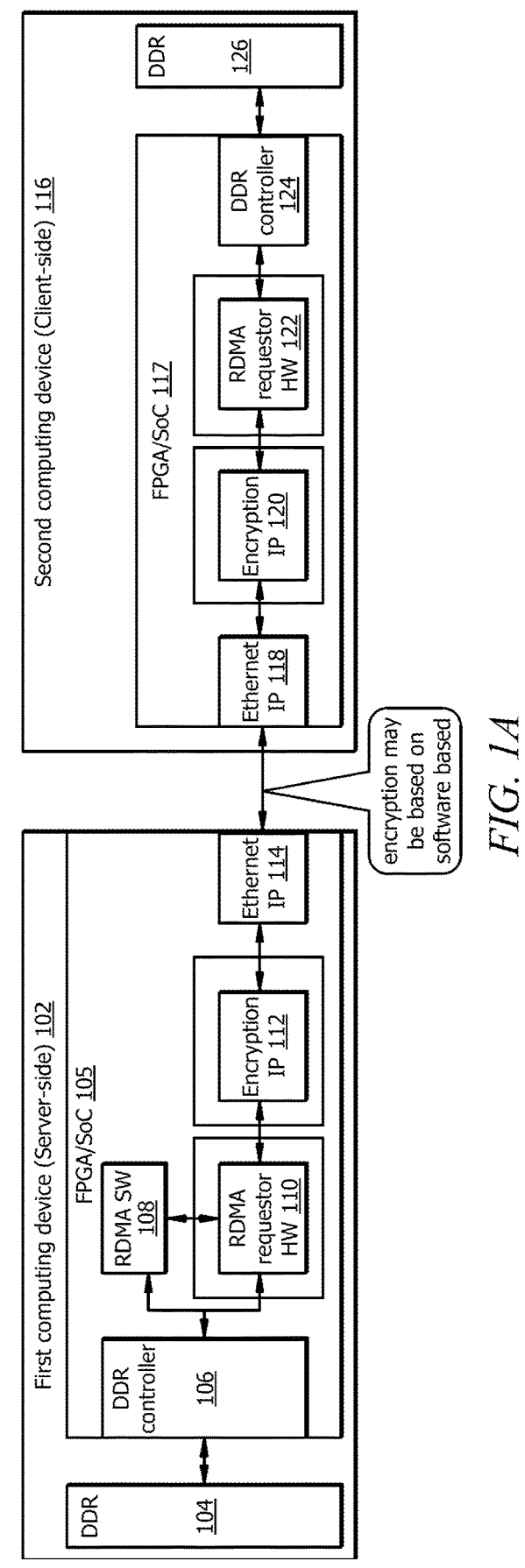
FIG. 1A illustrates an example of a hardware IP core including secure remote memory access (RDMA), according to particular embodiments.

Embodiments of the present disclosure relate to a method executed by a secure remote direct memory (RDMA) system. The method includes detecting, by the secure RDMA system, a connection request to create an encrypted connection between a first computing device and a second computing device. An encryption key is shared between the first computing device and the second computing device. In response to sharing the encryption key, accessing a plurality of images of a plurality of memories of the second computing device. The plurality of images of the plurality of memories includes memory addresses. The method includes receiving an access request specifying a range of memory addresses from the first computing device based on accessing the plurality of images of the plurality of memories. The method includes creating an encrypted tunnel between the first computing device and the second computing device to share memory information based on the range of memory addresses of the plurality of memories, in response to the access request.

Embodiments of the present disclosure relate to a system that includes a secure remote direct memory access (RDMA) system. The secure RDMA may be configured in a field programmable gate array (FPGA) system. The secure RDMA includes a plurality of processors operably coupled with one or more memories. A processor of the plurality of processors may be configured to detect a connection request to create an encrypted connection between a first computing device and a second computing device. Upon detecting a connection request, an encryption key may be shared between the first computing device and the second computing device. The processor may be configured to access a plurality of images of a plurality of memories of the second computing device, in response to sharing the encryption key. The plurality of images of the plurality of memories includes memory addresses. The processor may be configured to receive an access request specifying a range of memory addresses from the first computing device based on accessing the plurality of images of the plurality of memories. The processor may be configured to create an encrypted tunnel between the first computing device and the second computing device to share memory information based on the range of memory addresses of the plurality of memories, in response to the access request.

Embodiments of the present disclosure relate to one or more computer-readable non-transitory storage media including instructions that, when executed by one or more processors of a system that includes a secure remote direct memory access (RDMA) system, are configured to cause the one or more processors to perform one or more operations. The processors may be configured to detect a connection request to create an encrypted connection between a first computing device and a second computing device. In response to the connection request, an encryption key may be shared between the first computing device and the second computing device. The processors may be configured to access a plurality of images of a plurality of memories of the second computing device, in response to sharing the encryption key. The plurality of images of the plurality of memories includes memory addresses. The processors may be configured to receive an access request specifying a range of memory addresses from the first computing device based on accessing the plurality of images of the plurality of memories. The processors may be configured to create an encrypted tunnel between the first computing device and the second computing device to share memory information based on the range of memory addresses of the plurality of memories, in response to the access request.

EXAMPLE EMBODIMENTS

Embodiments of the present disclosure provide a secure remote direct memory access (secure RDMA) system to protect computers, computing devices, server computers, data servers, and computing systems with a single hardware security controller (HSC). Embodiments of the present disclosure protect the secure RDMS system within a single rack or chassis or blade center with the single HSC rather than instantiating a full hardware security controller on each board. The RDMA system may be configured to create a secure encrypted tunnel from the HSC to a target computer and send commands to the target computer to directly read, write, and change a live memory of a second single-board computer of the target computer without the intervention of the operating environment of the target computer. Embodiments utilize a hardware IP core (Secure Remote Memory Access (SERMA)) that may be used as an HSC SERMA controller that may be instantiated in Field Programmable Gate Arrays (FPGA) in the HSC. A SERMA receiver core may be instantiated as any of software application and very high-speed integrated circuit (VHSIC) hardware description language (VHDL) code in the FPGA on each target computer in the chassis or rack or blade center. The HSC SERMA controller initiates a media access control security (MACSec) encrypted connection with the SERMA receiver core of the target computer using an asymmetric key exchange to establish a symmetric encryption key for the encrypted tunnel. The symmetric encryption key, for example, advanced encryption standard (AES-128) may be configured with multiple algorithms to generate the symmetric encryption key to generate an encrypted session for the encrypted tunnel. Once the encrypted session is established, the HSC SERMA Controller may issue a series of standard direct memory access (DMA) commands to be executed by the SERMA receiver on the target computer. Upon receiving the DMA commands from the HSC SERMA controller and establishing the encrypted tunnel, the SERMA receiver core may provide image representations of the live memory and live memory addresses. The results of the command execution including the image representations and a range of the live memory addresses of the live memory may be passed back to the HSC SERMA controller through the encrypted connection, where the HSC may then process and take further action based on user-defined response actions. The user-defined response actions may include monitoring the live memory information and detecting a change or update in the memory information to detect whether the change or update is impacted by malicious or anomaly activities. The user-defined response actions may be executed either through the SERMA encrypted connection or by an external security event and incident monitoring software application or similar.

Embodiments of the present disclosure provide a solution to the existing systems. Existing systems and other means may be used for gathering memory images from target computers that exist at a number of levels. However, such existing systems and other means require a device within the target computer, or they depend on software applications running within the operating environment of the target computer to provide memory update information to a monitoring system to detect malicious events. For example, when reading live memory through an application running within the operating environment, the live memory changes based on the operating environment actively monitoring. Similar to the Heisenberg principle, when reading, writing to, or monitoring the live memory, the existence of that malicious activity has an impact on the live memory, such that the image obtained cannot be trusted as a true forensic image of what is actually occurring in the live memory space. This can be due to the ability of anomalous or malicious actions to hide themselves from memory interrogation by the operating environment as a forensic countermeasure, or simply something as benign as the live memory being used by the memory monitoring process evicting or moving contents to written cache, thereby eliminating them from the live memory capture. Existing systems rely upon DMA as a means of avoiding the "operating environment" contamination process by using a hardware device connected directly to the target computer through a peripheral component interconnect express (PCIe) connection. By connecting the hardware device, either permanently or temporarily, the access to the live memory of the operating environment is an external read that circumvents a processor and operating system of the target computer allowing memory to be directly accessed, read, changed, etc., as it truly sits for the operating environment.

To address the problems noted above, the present disclosure provides a solution firstly to make the DMA functions securely available from a remotely connected device. In some embodiments, the present disclosure provides a solution of using a single HSC that may perform the DMA functions across a number of connected target computers within a single chassis or rack or blade center, instead of requiring a separate HSC in each target computer. By embedding the SERMA controller solution into the HSC running on the single-board computer, the communication may securely break and securely access the live memory images for read or write or change access and hand off the memory information securely to a dedicated security device for adjudication and response action. By removing the need for a separate HSC for each target computer. The present disclosure provides a cost-effective solution and minimizes processing overhead from the target computers.

Embodiments of the present disclosure protect remote target computers within the single rack or chassis or blade center with the single HSC rather than instantiating a full HSC on each board. The HSC may be configured to identify anomalous or malicious code or event attempting to execute in the live memory, and/or capture a forensic snapshot of the live memory for external analysis post-event. The HSC responds to the malicious event when the anomalous and/or malicious code is identified in the live memory by performing one or more of the user-defined actions including, but not limited to, rewriting memory to a last known good state, logging and capturing live memory images, shutting down the single board computer, and implement user-defined actions from a security event and incident monitoring (SIEM) application.

Other technical advantages will be readily apparent to one skilled in the art from the following figures, descriptions, and claims. Moreover, while specific advantages have been enumerated above, various embodiments may include all, some, or none of the enumerated advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A illustrates an example of a hardware internet protocol (IP) core system 100A including the secure RDMA (SERMA) system 108 in a system-on-chip (SoC) 105, according to particular embodiments. The SERMA system 108 may be a software system that runs inside a Linux computer resident in the SoC 105 that creates, and processes DMA commands sent to and received from client-side systems 116. In an embodiment, FIG. 1A illustrates the IP core system 100A to monitor multiple devices, systems, client units, and different boards in a single rack/chassis/ blade center with a single HSC instantiated as SoC-based secure RDMA system 108, rather than instantiating a full hardware security controller (HSC) on each board with which one embodiment can be implemented. In an embodiment, the IP core system 100A comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. For example, IP core system 100A may include multiple server-side systems similar 102 with the secure RDMA 108 instantiated as SoC/FPGA 102 and multiple client-side systems 116. Other arrangements may include fewer or different components, and the division of work between the components may vary depending on the arrangement.

FIG. 1A illustrates the SoC example depicting the secure RDMA (SERMA) implementation between two SoCs 105 and 117 with an encrypted connection between them. In an embodiment, the IP core system 100A includes a first computing device 102 that may be configured with the secure RDMA system 108 and a second computing device 116. For example, the secure RDMA system 108 may be enabled by the Xilinx Multiprocessor system on a chip (MPSoC). In some embodiments, the first computing device 102 may be a server-side system 102 and the second computing device 116 may be a client-side system 116.

In an embodiment, the server-side system 102 may be any of one or more server computers, computing devices, and/or one or more virtual compute instances and storage instances that are coupled to the client-side systems 116 over the PCIe bus connection in a FPGA environment. In an embodiment, the server-side systems 102 may be hard-wired to perform the techniques or may include digital electronic devices such as at least one application-specific integrated circuit (ASIC) or FPGA that is persistently programmed to perform the techniques or may include at least one general purpose hardware processor programmed to perform the techniques pursuant to program instructions in firmware, memory, other storage, or a combination. Such server-side system 102 may also combine custom hard-wired logic, ASICs, or FPGAs with custom programming to accomplish the described techniques.

In an embodiment, the first computing device 102 acting as the server-side system 102 may include, but are not limited to, double data rate (DDR) memory 104, and FPGA/ SoC 105. The FPGA/SoC 105 includes DDR memory controller 106, RDMA software (SW) system 108, RDMA requestor hardware (HW) 110, encryption IP 112, and Ethernet IP 114.

In an embodiment, the secure RDMA 108 may send and receive data from the DDR controller 106 to store in the DDR memory 104. The secure RDMA 108 may process data from DDR memory 104, for example, comparing the stored memory data with the received memory data. The RDMA system 108 may be configured to detect a connection request to create an encrypted connection between the first computing device 102/server-side system 102 and the second computing device 116/client-side system 116. In an embodiment, the connection request may be detected over the PCIe bus connection or PCIe backplane based on any of the user-defined commands to establish a streaming encrypted connection and periodically run commands set to establish an encrypted connection. For example, periodically run commands may be set at regular or preset intervals where a connection request to establish the encrypted connection with the second computing device 116. In one example, the user-defined commands and periodically run commands may be received via application programming calls (API) or hypertext transfer protocol (HTTP) requests.

In an embodiment, the connection request from the first computing device 116 may be detected by the RDMA requestor 110. In an embodiment, the connection request may be sent to the second computing device 116/client-side system 116 via API calls or HTTP requests. The secure RDMA 108 may be coupled to RDMA requestor HW 110 to transmit data including the connection request and receive data including the memory data or memory information from the second computing device 116/client-side system 116.

Upon detecting the connection request at the RDMA system 108 of the first computing device 102, the encryption IP 112 creates an encryption key or series of encryption keys to share with the second computing device 116/client-side system 116. The encryption IP 112 may be configured to create multiple symmetric and asymmetric, using quantum-resistant and legacy encryption algorithms. For example, in one embodiment, AES GCM may be used with both 256-bit and 128-bit keys and uses MACsec IP to encrypt and decrypt the Ethernet frames to and from the second computing device 116/client-side system 116. The encryption IP 112 receives IPV6 Ethernet frames from the RDMA requestor 110 and may use MACsec TX (transmission) IP, which in turn, encrypts and signs the Ethernet frames destined for the second computing device 116/client-side system 116. The encryption IP 112 may receive IPV6 Ethernet frames from the second computing device 116/client-side system 116 and uses MACsec RX (receive) IP, which in turn verifies the digital signature and decrypts the Ethernet frames from the second computing device 116 and then sends the Ethernet frames to the RDMA requestor 110 for additional processing. In an embodiment, the encrypted connection request may be software-based for establishing the streaming connection. For example, the encrypted connection may be media access control security (MACsec) encryption to authorize the streaming connection between the first computing device 102 and the second computing device 116. Upon sharing the encryption key, the RDMA system 108 may be configured to access a plurality of images of a plurality of memories, for example, live memories and memory information or memory data from memory addresses of the plurality of (live) memories. In particular embodiments, the second computing device 116 may provide the plurality of images of the live memories in encrypted format to the RDMA system 108 of the first computing device 102.

The secure RDMA system 108 may be configured to send access requests using the Ethernet IP 114. The Ethernet IP 114 may be responsible for the actual transmission of the MACsec encrypted Ethernet frames to the second computing device 116/client-side system 116 and for the receipt of MACsec encrypted Ethernet frames from the second computing device 116/client-side system 116. In an embodiment, the RDMA system 108 may be configured to transmit a plurality of access request commands specifying a range of the plurality of memory addresses of the plurality of memories. The access request may be in the form of any of access request commands including, but are not limited to, Ethernet IP frames, internet protocol version 6 (IPv6) ethernet type commands, MACsec ethernet type commands, and IP commands. In an embodiment, the RDMA requestor HW 110 receives data including the access request from the RDMA system 108 and transmits to the second computing device 116/client-side system 116 by converting the access request into IPV6 Ethernet frames. In some embodiments, the RDMA requestor HW 110 may be configured to fragment data into TCP Ethernet frames, UDP Ethernet frames, Infini-Band ROCE compliant SEND Op Codes.

The secure RDMA system 108 may be configured to create an encrypted tunnel with the second computing device 116/client-side system 116 through which the first computing device 102 may be configured to receive response information in response to the access request from the second computing device 116. In some examples, the RDMA system 108 may be configured to access memory information based on the range of memory addresses of the plurality of memories (live memories). For example, the range of memory addresses may correspond to key memory addresses specified in the access request or in the user-defined access requests. In an embodiment, the encryption IP 112 may be configured to act as a decryption unit to decrypt the memory data or memory information received through the encryption tunnel from the second computing device 116/client-side system 116. For example, the RDMA requestor HW 110 may be configured to receive memory data or memory information in the form of IPV6 Ethernet frames from the second computing device 116/client-side system 116 and convert the memory data to the raw data used by the RDMA system 108. After converting memory data into raw data, the DDR controller 106 may be configured to write memory data into the DDR memory 104 to store the memory data or memory information received from the second computing device 116/client-side system 116 in the DDR memory 104. The stored memory data or memory information may be received from the DDR memory 104 by the DDR controller 106. In particular, the recent memory data or memory information received by the DDR controller 106 may be used later to compare with the new memory data or new memory information to detect changes or updates that may correspond to anomalies or malicious actions.

In an embodiment, the second computing device 116 may be configured to act as a client-side system 116. The client-side system 116 may be server computers different from the server-side system 102 that may be configured with the secure RDMA system 102a. In an embodiment, the client-side system 116 may be workstations, personal computers, portable computer systems, handheld devices, mobile computing devices, SoC boards, wearable devices, internetworking devices, autonomous or semi-autonomous devices such as robots or unmanned ground or aerial vehicles, any other electronic device that incorporates hardwired and/or program logic to implement the described techniques, one or more virtual computing machines or instances in a data center, and/or a network of server computers and/or personal computers. In an embodiment, the client-side system 116 may be connected over a peripheral component interconnect express (PCIe) bus connection and may become part of the same chassis of the FPGA environment. In an embodiment, the configuration of the second computing device 116/client-side system 116 may be similar to the server-side system 102 except that the secure RDMA system 108 may be instantiated only by a master server-side system, for example, server-side system 102.

Referring to FIG. 1A, the second computing device 116/client-side system 116 may include FPGA/SoC board 117, and DDR memory 126. The FPGA/SoC 117 may include Ethernet IP 118, encryption IP 120, RDMA responder hardware (HW) 122 and DDR controller 124. The encryption key or the series of encryption keys created by the encryption IP 112 may be shared with the second computing device 116/client-side system 116 via the encryption IP 120, based on the connection request for establishing the streaming connection. In an embodiment, the RDMA responder HW 122 may receive the connection request and upon receiving the encryption key, the RDMA responder 122 may be configured to access the plurality of images of the plurality of memories of the DDR memory 126 via the DDR controller 124. The DDR controller 124 may be configured to read and detect the access request specifying the access request commands from the first computing device 102/server-side system 102. The DDR controller 124 may be configured to transmit the memory data or memory information from the memory addresses of the plurality of memories in the DDR memory 126 based on the access request. The memory information or memory data may be encrypted by the encryption IP 120. In an embodiment, the memory information or memory data may be provided to the first computing device 102 in the same form that matches with the form of access request. For example, if the access request is in the form of IPv6 form, then the Ethernet IP 118 transmits the memory data or memory information from the range of memory addresses in the form of IPV6 form. If the access request is in the form of a plain text (PT) data access request, then the Ethernet IP 118 may transmit the memory data or memory information in the form of PT data. Similarly, if the access request is in the form of a cryptographic text (CT) data access request, then the Ethernet IP 118 may transmit the memory data or memory information in the form of CT data.

In an embodiment, the first computing device 102 configured with the secure RDMA system 102a may act as the server-side system 102 to control and monitor multiple second computing devices 116 or the client-side systems 116 and other devices or systems that may be connected over a peripheral component interconnect express (PCIe) bus connection or PCIe interface associated with the FPGA system. This manner of using the single HSC controller or the secure RDMA system 102a as the server-side system enable performing the monitoring or controlling the multiple client-side systems or any of the multiple boards connected over the PCIe bus or PCIe bus connection. In an embodiment, utilization of the single HSC controller or the secure RDMA system 102a as the server-side system enable performing the monitoring or controlling the multiple client-side systems or any of the multiple boards connected over the PCIe bus or PCIe bus connection in the single rack/chassis/blade center. Also, the utilization of the single secure RDMA system 102a as the server-side system enable read DDR memory of any second computing device 116 or the client-side system 116 or another board in the single chassis. This arrangement may server to client communication of direct memory access (DMA) rather than client to client DMA and thus eliminate the need of instantiating a full HSC on each board separately. In an embodiment, the server-side system 102 instantiated with the single HSC secure RDMA 102a may be configured to establish an encrypted connection using encryption keys to directly read memory data/information from memory images associated with different memory address ranges of the client-side system 116 and compare the memory data with recently captured memory data. From comparison, the secure RDMA system 102a may be configured to use the encryption keys to decrypt the memory data received from the client-side system 116 to analyze and determine changes or updates in the memory data of the client-side system 116. From the changes or updates in the memory data, the single secure RDMA system 102a of the server-side system 102 may be configured to detect the anomalies or malicious events at various client-side systems 116 that may be connected over the PCIe connection bus.

Figure 1B:
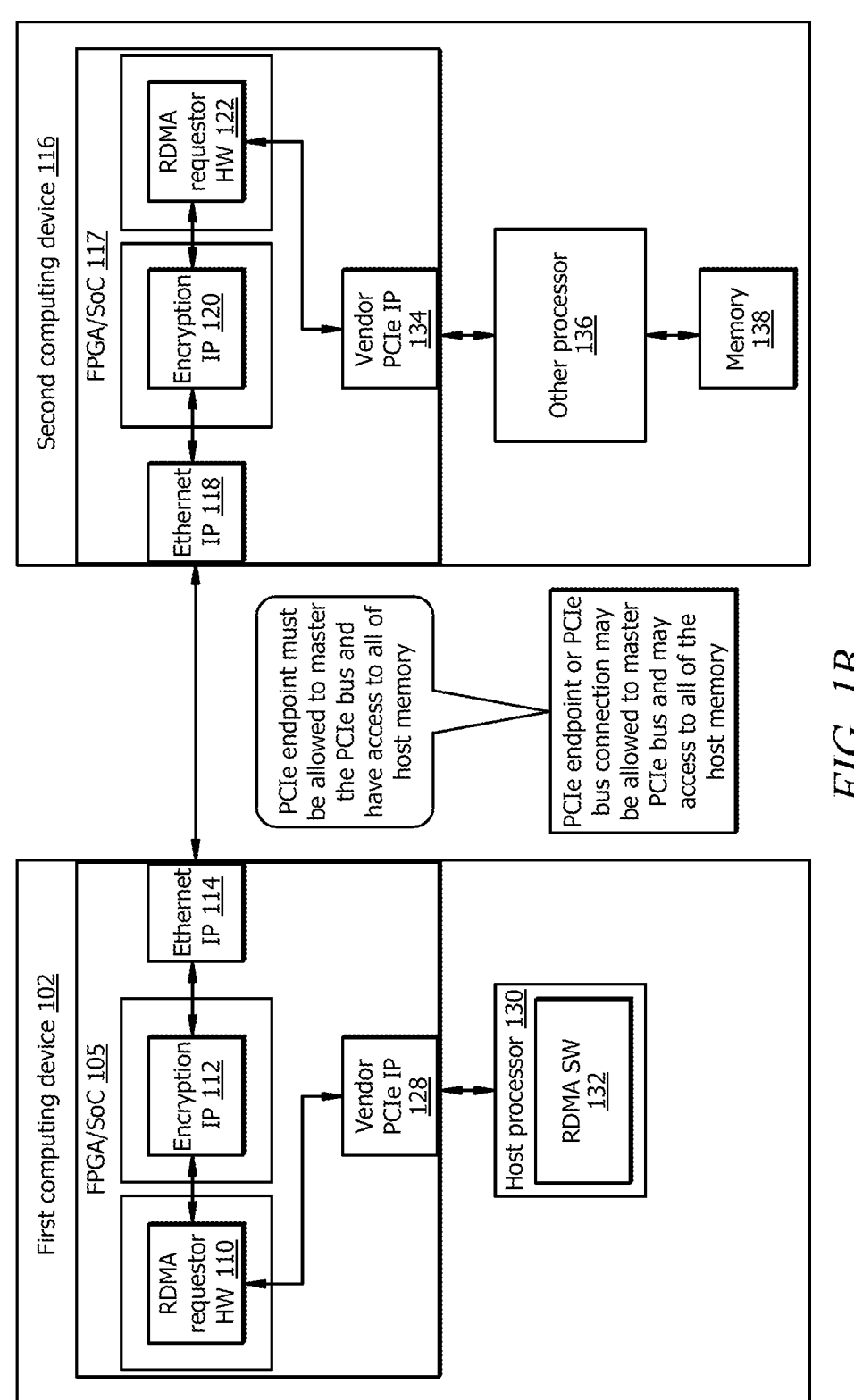
FIG. 1B illustrates an example of processor-to-processor hardware (HW) accelerated secure RDMA, according to particular embodiments.

FIG. 1B illustrates a central processing unit (CPU) example of processor-to-processor hardware (HW) accelerated secure RDMA 132, according to particular embodiments. FIG. 1B contains internal IP cores that may be located inside the SoC which form the basis of SERMA 108 in FIG. 1A. In an embodiment, the first computing device 102 includes all the components similar to the components from FIG. 1A. The SoC example in FIG. 1A is intended for use with single board computer (SBC) form factors, whereas, in the CPU example, the RDMA software is loaded onto server-side system 102, and the remainder of the SERMA components may be contained in a hardware accelerator board in any of a number of form factors, such as PCIe, etc. In an embodiment, the secure RDMA 132 may be the single HSC that may be installed or configured in a host processor 130 of the first computing device 102. The host processor 130 may include the secure RDMA 132 and the host processor 130 may be connected to the FPGA/SoC 105 over a vendor PCIe IP 128. The host processor 130 may be configured to acts as master processor to master PCIe bus connection and may access all of host memory of second computing device 116/client-side system 116. The second computing device 116 may be configured with processors 136 that may be coupled with memory 138. The processors 136 of the second computing device 116 may be connected to the SoC 117 over vendor PCIe IP 134. In this way, the RDMA system 132 may be configured to communicate with processors 136 of second computing device 116 and other client-side systems 116 that may be connected over the vendor PCIe IP bus connection 128 and 134. Such communication between the processor 130 of the first computing device 102/server-side system 102 and the processors 136 of the second computing device 116/client-side system 116 to read, write, access, and monitor the memory 138 of the second computing device 116.

FIG. 2 depicts an example flowchart illustrating a process 200 for secure memory access using the single HSC that may be the secure RDMA 108/132, according to particular embodiments. The process 200 may be executed by any of the secure RDMA 108 that may be configured in the FPGA system 105 and the secure RDMA 132 that may be configured in the host processor 130 of the first computing device 102/server-side system 102. The secure RDMA system 108/132 may assign the first computing device 102 as a host or master computing device connected to the PCIe connection bus.

In particular embodiments, the secure RDMA 108/132 may be enabled by Xilinx MPSoC. The secure RDMA system 108/132 is configured in FPGA system. The secure RDMA system 108/132 includes any of a HSC system and a software security controller (SSC) system. In an embodiment, the secure RDMA system 108/132 being the HSC system may correspond to monitor hardware components and the secure RDMA system 108/132 being the SSC system may correspond to monitor software applications running in the processors 136 and/or applications running in the second computing device 116/client-side system 116.

Process 200 may begin at step 202 that may be programmed to detect the connection request to create the encrypted connection between the first computing device 102 and the second computing device 116. The connection request includes a read command, a write-to command, a change command to change memory data in a plurality of ranges of memory addresses, and an access command to access the memory data from a plurality of ranges of memory addresses. In an embodiment, the connection request may be detected over the PCIe bus connection or PCIe backplane based on any of user-defined commands to establish a streaming encrypted connection and periodically run commands set to establish an encrypted connection. For example, periodically run commands may be set at regular or preset intervals where a connection request to establish the encrypted connection with the second computing device 116. In an embodiment, the process may include creating any of MACsec encrypted connection and IP encrypted connection corresponding to the encrypted connection of the connection request between the first computing device 102 and the second computing device 116. In an embodiment, an encryption key may be shared between the first computing device 102 and the second computing device 116. For example, upon detecting the connection request at the RDMA system 108 of the first computing device 102, the encryption IP 112 creates the encryption key or series of encryption keys to share with the second computing device 116/client-side system 116.

At step 204, the second computing device 116/client-side system 116 may read or access a plurality of images or snapshots or representations of a plurality of memories of the second computing device 116/client-side system 116 in response to sharing the encryption key. The memories may be associated with memory addresses of different memory locations. For example, upon sharing the encryption key, the RDMA system 108 may be configured to access a plurality of images of a plurality of memories, for example, live memories and memory information or memory data from memory addresses of the plurality of (live) memories. In particular embodiments, the second computing device 116 may provide the plurality of images of the live memories in encrypted format, corresponding to the shared encryption key, to the RDMA system 108 of the first computing device 102. In an embodiment, the plurality of images of the plurality of memories may be stored in DDR memory 104 of the first computing device 102/server-side system 102.

At step 206, an access request specified with a range of memory addresses may be received from the first computing device 102/server-side system 102 based on accessing the plurality of images of the plurality of memories. The access request specifying the range of memory addresses includes data frames in a format selected from any of ethernet type access request, MACsec type access request, and IP type access request. For example, Ethernet IP frames, IPv6 ethernet type commands, MACsec type commands, and IP commands. The RDMA system 108/132 may be configured to send access request using the Ethernet IP 112. In an embodiment, the RDMA system 108 may be configured to transmit the plurality of access request commands specifying the range of the plurality of memory addresses of the plurality of memories. In an embodiment, the access request may be received by the second computing device 116 in encrypted format and the second computing device 116 decrypts the access request and then execute the read, or access the memory data or memory information from the range of memory addresses.

At step 208, an encrypted tunnel may be created in response to the access request. The encrypted tunnel may be created between the first computing device 102 and the second computing device 116 to share memory information based on the range of memory addresses of the plurality of memories. In some examples, the RDMA system 108/132 may be configured to access the memory information based on the range of memory addresses of the plurality of memories (live memories). For example, the range of memory address may correspond to key memory addresses specified in the access request or in the user-defined access requests. The second computing device 116 sends the memory data in encrypted form back to the first computing device 102. The encrypted form of the memory information from the range of memory addresses may be shared through the encrypted tunnel from the second computing device 116 to the first computing device 102. The memory information may be shared in a form selected from any of CT frames and PT frames depending upon CT packets and PT packets specified in the access request. The RDMA system 108 may be configured to receive memory data or memory information through the encrypted tunnel from the second computing device 116/client-side system 116.

In an embodiment, the received memory information or memory data may be decrypted by the Ethernet IP 112. The RDMA system 108/132 may compare the received memory data with the recently stored memory data to detect a change or update in the memory data. In case the memory data may be changed, anomalies or malicious action may be determined based on the changed memory data. This manner of using the single HSC controller, for example, the secure RDMA system 102a as the server-side system enable performing the monitoring or controlling the multiple client-side systems or any of the multiple boards connected over the PCIe bus or PCIe bus connection. In an embodiment, utilization of the single HSC controller or the secure RDMA system 102a as the server-side system enable performing the monitoring or controlling the multiple client-side systems or any of the multiple boards connected over the PCIe bus or PCIe bus connection in the single rack/chassis/blade center. Also, the utilization of the single secure RDMA system 102a as the server-side system enable read double data rate (DDR) memory of any second computing device 116 or the client-side system 116 or another board in the single chassis. This arrangement may server to client communication of direct memory access (DMA) rather than client to client DMA and thus eliminate the need of instantiating a full HSC on each board separately. In an embodiment, the server-side system 102 instantiated with the single HSC secure RDMA 102a may be configured to establish an encrypted connection using encryption keys to directly read memory data/information from memory images associated with different memory address ranges of the client-side system 116 and compare the memory data with recently captured memory data. From comparison, the secure RDMA system 102a may be configured to use the encryption keys to decrypt the memory data received from the client-side system 116 to analyze and determine changes or updates in the memory data of the client-side system 116. From the changes or updates in the memory data, the single secure RDMA system 102a of the server-side system 102 may be configured to detect the anomalies or malicious events at various client-side systems 116 that may be connected over the PCIe connection bus. Based on the detected anomalies, process may perform one or more of the user-defined actions including, but not limited to, rewriting memory to a last known good state, logging and capturing live memory images, shutting down the single board computer, and implement user-defined actions from a SIEM application.

An example is illustrated to the flow of data packets from RDMA system 108/132 to the second computing device 116 for accessing memory data to determine the anomalies or malicious actions. Consider the secure RDMA (SERMA) 108/132 may be enabled by Xilinx MPSoC. The SERMA 108/132 software passes data from a Linux kernel to FPGA programmable logic 105. Then, the RDMA system 108/132 sends FPGA IP 114 that creates IPV6 Ethernet frames from outgoing data corresponding to the access request. More particularly, the RDMA system 108/132 performs one or more functions, including but not limited to, fragments data into Ethernet frames, user datagram protocol (UDP) Ethernet frames, InfiniBand RDMA over Converged Ethernet (RoCE) complaint SEND Op Codes. The RDMA responder 112 receives FPGA IP 114 and uses the same protocol to strip headers and pass the payload data to a kernel. In particular embodiments, SERMA system 108/132 or RDMA encryption 112 and authentication may be enabled by modular advanced encryption standard Galois Counter Mode internet protocol (AES GCM IP), using 256-bit keys. In an embodiment, 128-bit keys may also be used for encryption. The RDMA Ethernet frames are being passed to MACsec TX IP 114 where the MACsec TX encrypts and signs Ethernet frames at Ethernet IP 118. The MACsec Ips may run at ~25 Gbps that are suitable for 5G data rates. The RDMA Ethernet frames that are being received pass into MACsec RX IP 114 where the MACsec RX verifies the Ethernet frames and then decrypts the frames.

Figure 3B:
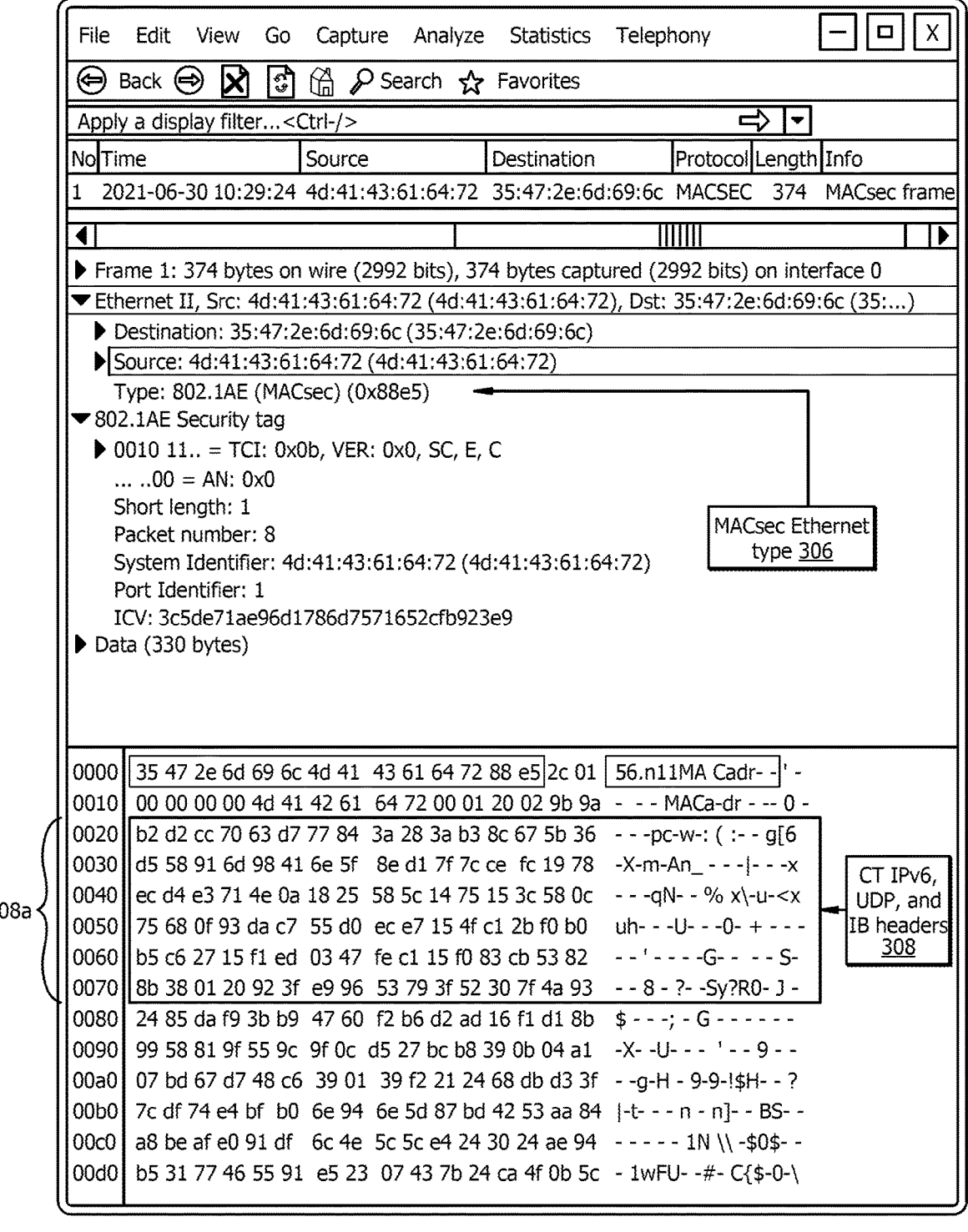

FIG. 3A, and FIG. 3B illustrates an example network packet analysis results 300, according to particular embodiments. In particular embodiments, the disclosure uses SERMA software, adds multiple key and source/destination MAC lookup for MACsec IP, implements on two MPSoC's and communicates with 10G/25G, implements on 7 nm Xilinx device, determines key exchange strategy, uses Infiniband ROCE compliant READ and WRITE Op Codes, and enables x86 host computer connected to PCIe endpoint. In FIG. 3A, IPV6 Ethernet Type "IPV6 (0x86dd)" 302 access request may be sent to the second computing device 116 and the PT IPV6, UDP and IB headers 304 of the memory data for the range memory addresses 304a may be displayed that may correspond to the IPV6 Ethernet Type "IPV6 (0x86dd)" 302 access request. In FIG. 3B, MACsec Ethernet Type "802.1AE (MACsec) (0X88e5)" 306 access request may be sent to the second computing device 116 and the CT IPV6, UDP and IB headers 308 of the memory data for the range memory addresses 308*a* may be displayed that may correspond to the MACsec Ethernet Type "802.1AE (MACsec) (0X88e5)" 306 access request.

Figure 4:
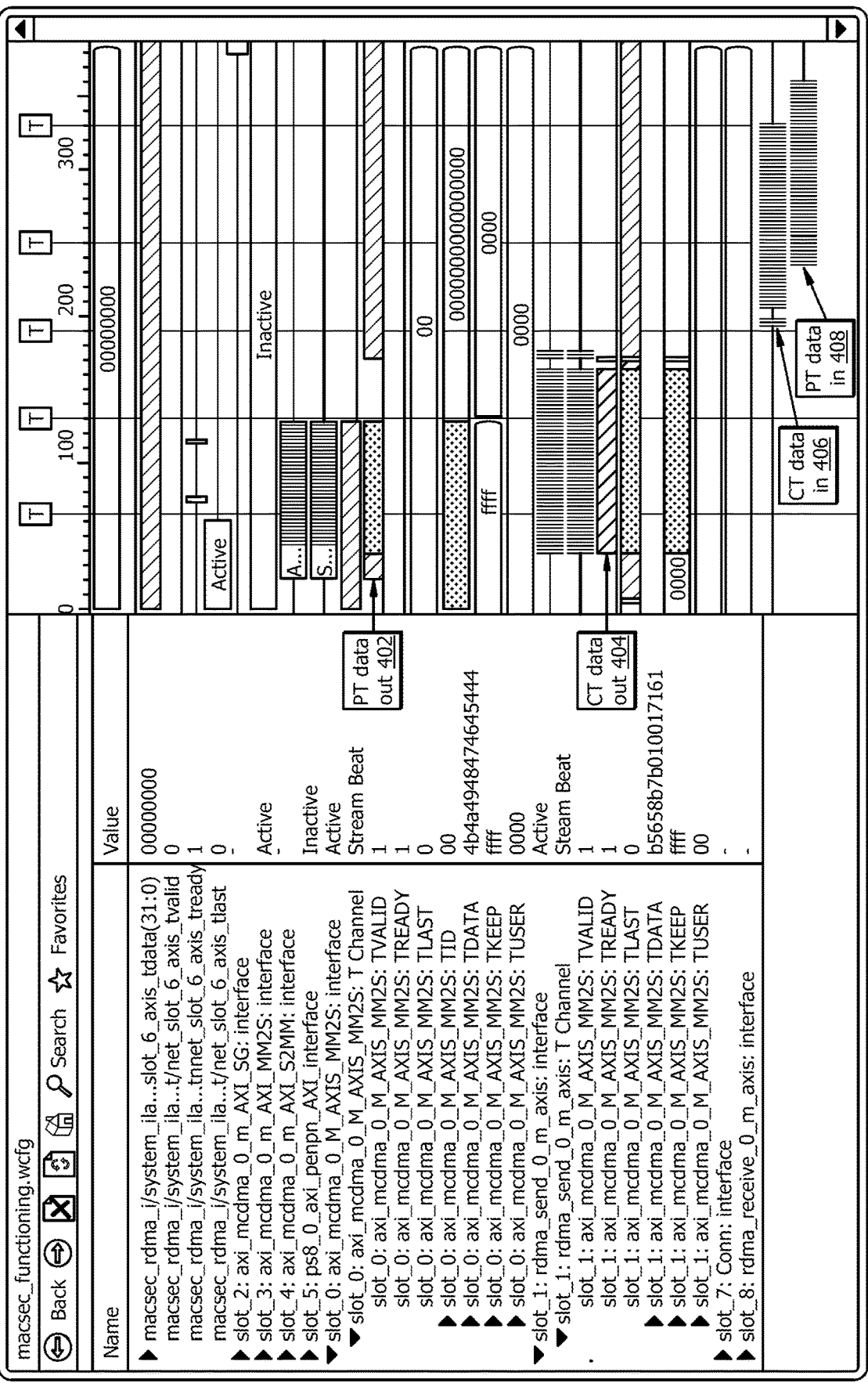
FIG. 4 illustrates an example of cryptographic (CT) data out commands, plain text (PT) data out commands and CT data in response and PT data in response, according to particular embodiments.

FIG. 4 illustrates an example of CT data out commands, PT data out commands and CT data in response and PT data in response, according to particular embodiments. FIG. 4 illustrates Vivado ILA captures taken using Zynq Ultrascale+, according to particular embodiments. PT data out 402 and CT data out 404 may be sent from the RDMA system 108/132 of the first computing device 102/server-side system 102 to the second computing device 116/client-side system 116. The second computing device 116/client-side system 116 may read and access the memory data or memory from different ranges of memory addresses. The memory data or memory may be sent as CT data in 406 and PT data in 408 for CT data out 404 and PT data out 402. The PT data in 408 and CT data in 406 may be compared with the stored memory data to detect a change or update in the memory data that may determine the anomalies. Based on the detected anomalies, process may perform one or more of the user-defined actions including, but not limited to, rewriting memory to a last known good state, logging and capturing live memory images, shutting down the single board computer, and implement user-defined actions from the SIEM application.

Figures 5B, 5C:
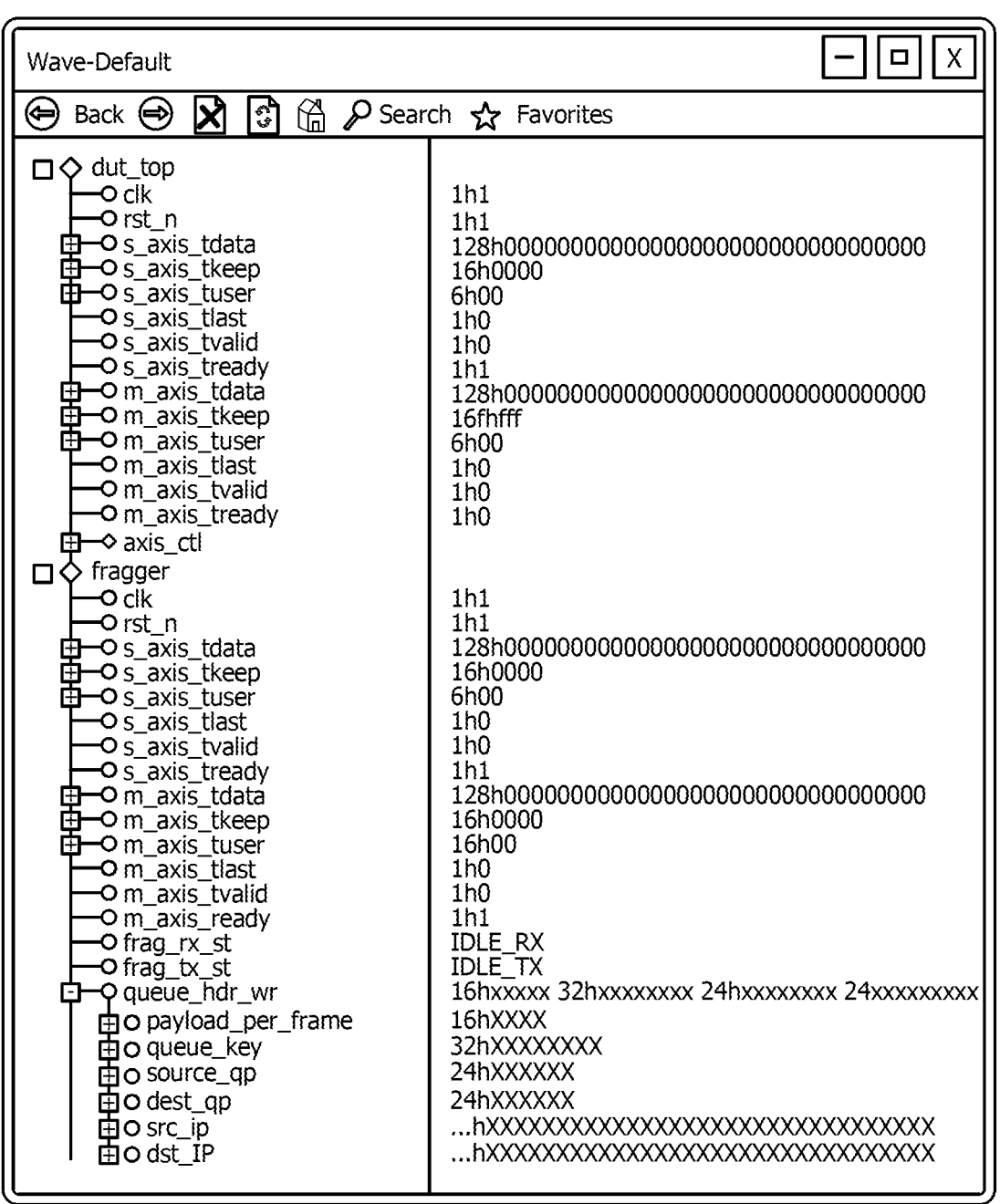

FIG. 5A, FIG. 5B, and FIG. 5C illustrates an example of constrained random self-checking simulations 500, according to particular embodiments. In an embodiment, the RDMA system 108/132 may be configured to generate constrained random input and uses third party C libraries to create expected output. Further, constrained random self-checking simulations stimulate IP with constrained input and checks actual output against expected.

Figure 6:
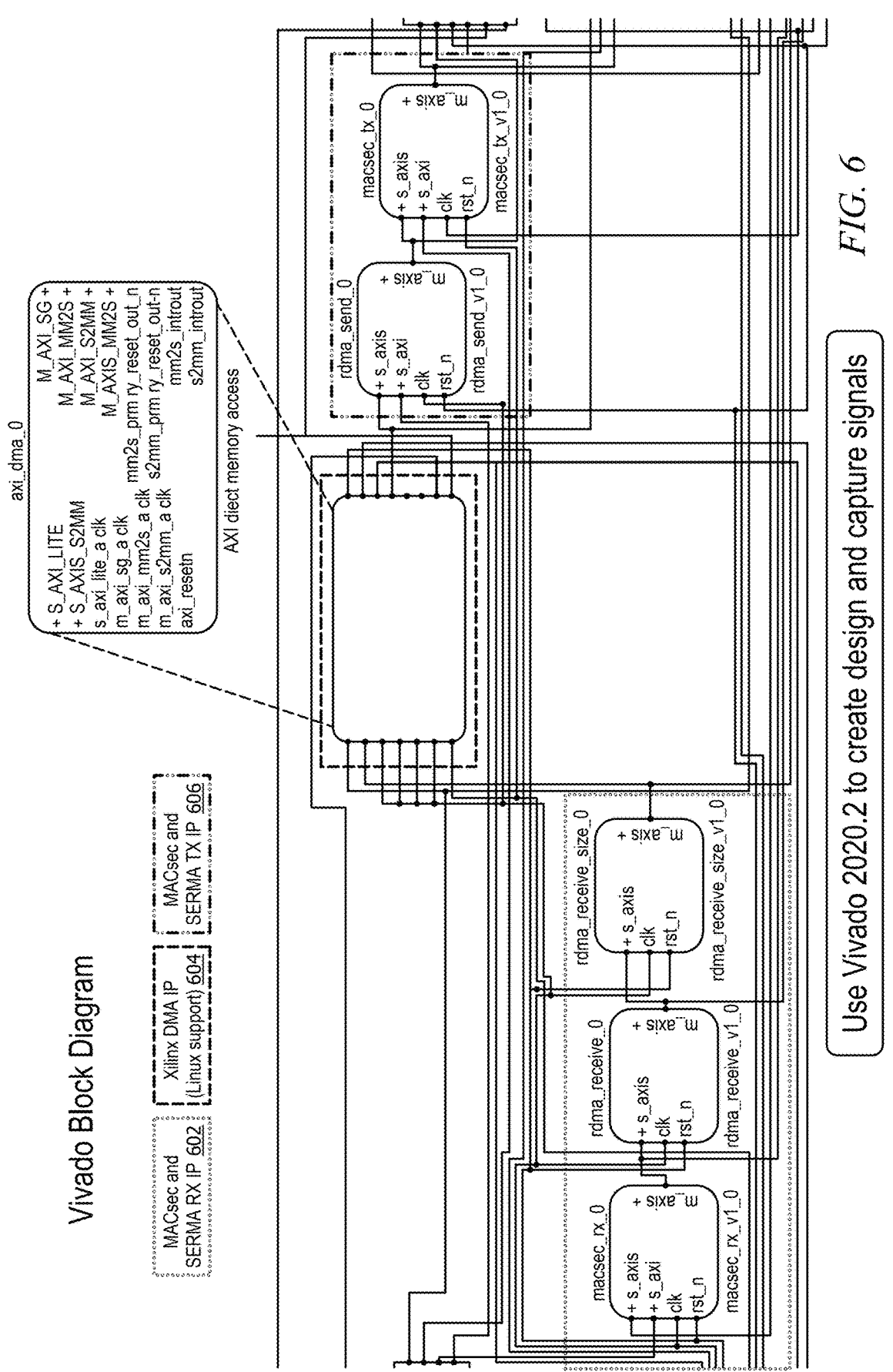
FIG. 6 illustrates an example of Vivado block diagram to create design and capture signals, according to particular embodiments.

FIG. 6 illustrates an example of Vivado block diagram to create a design and capture signals, according to particular embodiments. Vivado block diagram shows the wiring for the Encryption IP core 112. Vivado may be a modeling tool designed to help develop hardware description language (HDL) designs, which may be used to develop the actual FPGA code. In an embodiment, MACsec and SERMA TX IP 606 block show the connections within the FPGA for the transmission and encryption activities. MACsec and SERMA RX IP 602 block show the connections within the FPGA for receipt and decryption activities. In particular embodiments, the MACsec TX and RX IPs 602 may be created and function in MPSoC development board and both TX 606 and RX 602 hardware use single key implementation. The IPs of both MACsec TX IP 606 and RX IP 602 may be based on AXI stream (Advanced extensible Interface) compliant AES GCM 256 LM IRAD created Ips. In particular embodiments, the SERMA kernel software may be enabled by booting CentOS 8 or Petalinux kernel. The SERMA device or system operates in loopback mode using 10GBASE-R. SERMA may be enabled by Xilinx DMA IP 604. The Xilinx DMA IP 604 (Linux support) IP block shows the connections within the FPGA that translate DMA commands from the secure RDMA system 108/132 software into the hardware commands for transmission and receipt. This translation combined with the MACsec secure communications may allow to securely send and receive memory data from the second computing device 116/client-side system 116 that may be a remote computer.

FIG. 7 illustrates an exemplary self-test kernel module. In particular embodiments, the SERMA software uses Petalinux to create bootloader, u-boot, etc. and running CentOS 8 on ZU+ and acts as a verbs (rdma-core) provider. Further, the SERMA software interfaces with SERMA hardware for Ethernet and DMA setup using kernel modules. Using Linux, echo string into self-test kernel module while hardware is in loopback and dd is used to verify results.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method executed by a secure remote direct memory access (RDMA) system, the method comprising:

detecting, by the secure RDMA system, a connection request to create an encrypted connection between a first computing device and a second computing device, wherein an encryption key is shared between the first computing device and the second computing device, the secure RDMA system is configured in a single board chip as part of a single hardware security controller (HSC), and the single HSC is configured to establish encrypted connections with a plurality of external systems to read memory information from the plurality of external systems;

in response to sharing the encryption key, accessing a plurality of images of a plurality of memories of the second computing device, wherein the plurality of images of the plurality of memories comprises memory addresses;

receiving an access request specifying a range of memory addresses from the first computing device based on accessing the plurality of images of the plurality of memories;

in response to the access request, creating an encrypted tunnel between the first computing device and the second computing device to share memory information based on the range of memory addresses of the plurality of memories.

2. The computer-implemented method of claim 1, wherein the connection request comprises a read command, a write-to command, a change command to change memory data in a plurality of ranges of memory addresses, and an access command to access the memory data from a plurality of ranges of memory addresses.

3. The computer-implemented method of claim 1, further comprising creating any of a media access control security (MACsec) encrypted connection and an internet protocol (IP) encrypted connection corresponding to the encrypted connection between the first computing device and the second computing device.

4. The computer-implemented method of claim 1, wherein the secure RDMA system comprises any of a hardware security controller system and a software security controller system.

5. The computer-implemented method of claim 1, wherein the memory information from the range of memory addresses is encrypted to share through the encrypted tunnel from the second computing device to the first computing device, and the memory information is shared in a form selected from any of cryptographic text frames and plain text frames.

6. The computer-implemented method of claim 1, wherein the secure RDMA assigns the first computing device as a host computing device connected to a peripheral component interconnect Express (PCIe) connection bus.

7. The computer-implemented method of claim 1, wherein the access request specifying the range of memory addresses comprises data frames in a format selected from any of ethernet type access request, media access control security (MACsec) type access request, and internet protocol type access request.

8. A system, comprising:

a security remote direct memory access (RDMA) system configured in a Field Programmable Gate Array (FPGA) system, the secure RDMA comprising a plurality of processors, operably coupled with one or more memories, the secure RDMA system is configured in a single board chip as part of a single hardware security controller (HSC), and the single HSC is configured to establish encrypted connections with a plurality of external systems to read memory information from the plurality of external systems, and a processor of the plurality of processors configured to:

detect a connection request to create an encrypted connection between a first computing device and a second computing device, wherein an encryption key is shared between the first computing device and the second computing device;

in response to sharing the encryption key, access a plurality of images of a plurality of memories of the second computing device, wherein the plurality of images of the plurality of memories comprises memory addresses;

receive an access request specifying a range of memory addresses from the first computing device based on accessing the plurality of images of the plurality of memories;

in response to the access request, create an encrypted tunnel between the first computing device and the second computing device to share memory information based on the range of memory addresses of the plurality of memories.

9. The system of claim 8, wherein the connection request comprises a read command, a write-to command, a change command to change memory data in a plurality of ranges of memory addresses, and an access command to access the memory data from a plurality of ranges of memory addresses.

10. The system of claim 8, wherein the secure RDMA is configured to create any of a media access control security (MACsec) encrypted connection and an internet protocol (IP) encrypted connection corresponding to the encrypted connection between the first computing device and the second computing device.

11. The system of claim 8, wherein the memory information from the range of memory addresses is encrypted to share through the encrypted tunnel from the second computing device to the first computing device, and the memory information is shared in a form selected from any of cryptographic text frames and plain text frames.

12. The system of claim 8, wherein the secure RDMA assigns the first computing device as a host computing device connected to a peripheral component interconnect Express (PCIe) connection bus.

13. The system of claim 8, wherein the access request specifying the range of memory addresses comprises data frames in a format selected from any of ethernet type access request, media access control security (MACsec) type access request, and internet protocol type access request.

14. A non-transitory computer-readable medium storing instructions that when executed by a processor cause the processor to:

detect, by a secure RDMA system configured in a single board computer chip of a Field Programmable Gate Array (FPGA) system, a connection request to create an encrypted connection between a first computing device and a second computing device, wherein an encryption key is shared between the first computing device and the second computing device, the secure RDMA system is configured in a single board chip as part of a single hardware security controller (HSC), and the single HSC is configured to establish encrypted connections with a plurality of external systems to read memory information from the plurality of external systems;

in response to sharing the encryption key, access a plurality of images of a plurality of memories of the second computing device, wherein the plurality of images of the plurality of memories comprises memory addresses;

receive an access request specifying a range of memory addresses from the first computing device based on accessing the plurality of images of the plurality of memories;

17 in response to the access request, create an encrypted
tunnel between the first computing device and the
second computing device to share memory information
based on the range of memory addresses of the plurality
of memories.

15. The non-transitory computer-readable medium of
claim 14, wherein the connection request comprises a read
command, a write-to command, a change command to
change memory data in a plurality of ranges of memory
addresses, and an access command to access the memory
data from a plurality of ranges of memory addresses.

16. The non-transitory computer-readable medium of
claim 14, wherein the processor is further configured to
create any of a media access control security (MACsec)
encrypted connection and an internet protocol (IP) encrypted
connection corresponding to the encrypted connection
between the first computing device and the second comput-
ing device.

17. The non-transitory computer-readable medium of
claim 14, wherein the memory information from the range
of memory addresses is encrypted to share through the
encrypted tunnel from the second computing device to the
first computing device, and the memory information is
shared in a form selected from any of cryptographic text
frames and plain text frames.

18. The non-transitory computer-readable medium of
claim 14, wherein the access request specifying the range of
memory addresses comprises data frames in a format
selected from any of ethernet type access request, media
access control security (MACsec) type access request, and
internet protocol type access request.

\*  \*  \*  \*  \*

18